(12) United States Patent  
Brzek et al.

(10) Patent No.: US 8,955,303 B2
(45) Date of Patent: Feb. 17, 2015

(54) PULSE DETONATION SYSTEM

(75) Inventors: Brian Gene Brzek, Clifton Park, NY (US); Adam Rasheed, Glenville, NY (US); Narendra Digamber Joshi, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1295 days.

(21) Appl. No.: 12/717,799

(22) Filed: Mar. 4, 2010

(65) Prior Publication Data

US 2011/0214407 A1 Sep. 8, 2011

(51) Int. Cl.
*F02C 5/00* (2006.01)
*F02G 1/00* (2006.01)
*F02G 3/00* (2006.01)
*F02K 7/02* (2006.01)
*F01D 5/28* (2006.01)
*F02K 7/08* (2006.01)

(52) U.S. Cl.
CPC ... *F02K 7/02* (2013.01); *F01D 5/28* (2013.01); *F02K 7/08* (2013.01); *Y02T 50/67* (2013.01); *Y02T 50/672* (2013.01)
USPC ............... 60/39.76; 60/39.38; 60/247; 431/1

(58) Field of Classification Search
USPC ............... 60/39.76, 39.78, 39.38, 247; 431/1
See application file for complete search history.

(56) References Cited

U.S. PATENT DOCUMENTS

| 3,449,913 | A | 6/1969 | Grebe |
| 5,092,766 | A * | 3/1992 | Kubotani ............... 432/25 |
| 5,345,758 | A | 9/1994 | Bussing |
| 6,787,194 | B2 | 9/2004 | Eidelman |
| 7,818,956 | B2 * | 10/2010 | Rasheed et al. ............ 60/39.76 |
| 2005/0037299 | A1 * | 2/2005 | Gottzmann ............ 431/1 |
| 2006/0251821 | A1 | 11/2006 | Eidelman |
| 2006/0260291 | A1 | 11/2006 | Vandervort et al. |
| 2007/0157625 | A1 * | 7/2007 | Snyder et al. ............ 60/776 |
| 2008/0041065 | A1 | 2/2008 | Muller et al. |
| 2008/0085368 | A1 | 4/2008 | Gauthier |
| 2008/0155959 | A1 * | 7/2008 | Rasheed et al. ............ 60/39.76 |
| 2008/0187773 | A1 | 8/2008 | Erauzkin Bilbao et al. |
| 2011/0127456 | A1 * | 6/2011 | Kenyon et al. ............ 251/314 |

FOREIGN PATENT DOCUMENTS

EP 2072205 6/2009

OTHER PUBLICATIONS

Ghosn et al.; "Thermal Barrier and Protective Coatings to Improve the Durability of a Combustor under a Pulse Detonation Engine Environment," AIAA, 2007, pp. 4439-4448, Ohio Aerospace Institute, Materials and Structures Division, Cleveland, OH.

Rutledge et al., "Net Heat Flux Reduction for Pulsed Film Cooling on a Turbine Blade Leading Edge," 45th AIAA/ASME/SAE/ASEE Joint Propulsion Conference and Exhibit; Aug. 2-5, 2009, pp. 1-25, Denver, CO.

* cited by examiner

*Primary Examiner* — Craig Kim
(74) *Attorney, Agent, or Firm* — Scott J. Asmus

(57) ABSTRACT

In one embodiment, a pulse detonation system includes a pulse detonation tube including a base tube and a thermally protective layer disposed adjacent to an inner surface of the base tube. The thermally protective layer is configured to limit temperature fluctuations at the inner surface of the base tube to less than approximately 20 degrees Celsius during operation of the pulse detonation system, and the thermally protective layer does not comprise a ceramic coating.

9 Claims, 5 Drawing Sheets

PULSE DETONATION SYSTEM

BACKGROUND OF THE INVENTION

The subject matter disclosed herein relates generally to a pulse detonation system and, more specifically, to enhancing the durability of pulse detonation tubes.

Pulse detonation combustion can be utilized in various practical engine applications. An example of such an application is the development of a pulse detonation engine (PDE) where hot detonation products are directed through an exit nozzle to generate thrust for aerospace propulsion. Pulse detonation engines that include multiple combustor chambers are sometimes referred to as a "multi-tube" configuration for a pulse detonation engine. Another example is the development of a "hybrid" engine that uses both conventional gas turbine engine technology and pulse detonation (PD) technology to enhance operational efficiency. Such pulse detonation turbine engines (PDTE) can be used for aircraft propulsion or as a means to generate power in ground-based power generation systems.

Within a pulse detonation tube, the combustion reaction is a detonation wave that moves at supersonic speed, thereby increasing the efficiency of the combustion process as compared to subsonic deflagration combustion. Specifically, air and fuel are typically injected into the pulse detonation tube in discrete pulses. The fuel-air mixture is then detonated by an ignition source, thereby establishing a detonation wave that propagates downstream through the tube at a supersonic velocity. In addition, a weaker shock wave may propagate upstream toward the combustor inlet. The detonation process produces pressurized exhaust gas within the pulse detonation tube that may be used to produce thrust or be converted to work in a turbine.

Unfortunately, due to the high temperatures and pressures associated with detonation reactions, longevity of the pulse detonation tubes and associated components (e.g., air valve, nozzle, etc.) may be significantly limited. Increasing the thickness and/or strength of the pulse detonation tubes and/or associated components may increase the operational life of a pulse detonation combustor, but may also increase weight to an undesirable level for typical applications. Similarly, constructing the pulse detonation tubes and/or associated components from expensive high temperature materials may be economically unfeasible.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a pulse detonation system includes a pulse detonation tube including a base tube and a thermally protective layer disposed adjacent to an inner surface of the base tube. The thermally protective layer is configured to limit temperature fluctuations at the inner surface of the base tube to less than approximately 20 degrees Celsius during operation of the pulse detonation system, and the thermally protective layer does not comprise a ceramic coating.

In a second embodiment, a pulse detonation system includes a pulse detonation tube configured to resist a pressure associated with a detonation reaction. The pulse detonation system also includes a nozzle coupled to a downstream end of the pulse detonation tube and configured to receive a flow of exhaust gas from the pulse detonation tube. The pulse detonation system further includes a thermally protective layer disposed adjacent to an inner surface of the pulse detonation tube, to an inner surface of the nozzle, or a combination thereof. The thermally protective layer is configured to limit temperature fluctuations at the inner surface of the pulse detonation tube, at the inner surface of the nozzle, or a combination thereof, to less than approximately 20 degrees Celsius during operation of the pulse detonation system, and the thermally protective layer of the pulse detonation tube, if present, does not comprise a ceramic coating.

In a third embodiment, a pulse detonation system includes a pulse detonation tube and a nozzle coupled to a downstream end of the pulse detonation tube. The pulse detonation system also includes a turbine coupled to a downstream end of the nozzle and configured to receive a flow of exhaust gas from the pulse detonation tube via the nozzle. At least one of the nozzle or at least one component of the turbine includes a base material and a thermally protective layer disposed adjacent to a surface of the base material facing the flow of exhaust gas. The thermally protective layer is configured to limit temperature fluctuations at the surface of the base material facing the flow of exhaust gas to less than approximately 20 degrees Celsius during operation of the pulse detonation system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
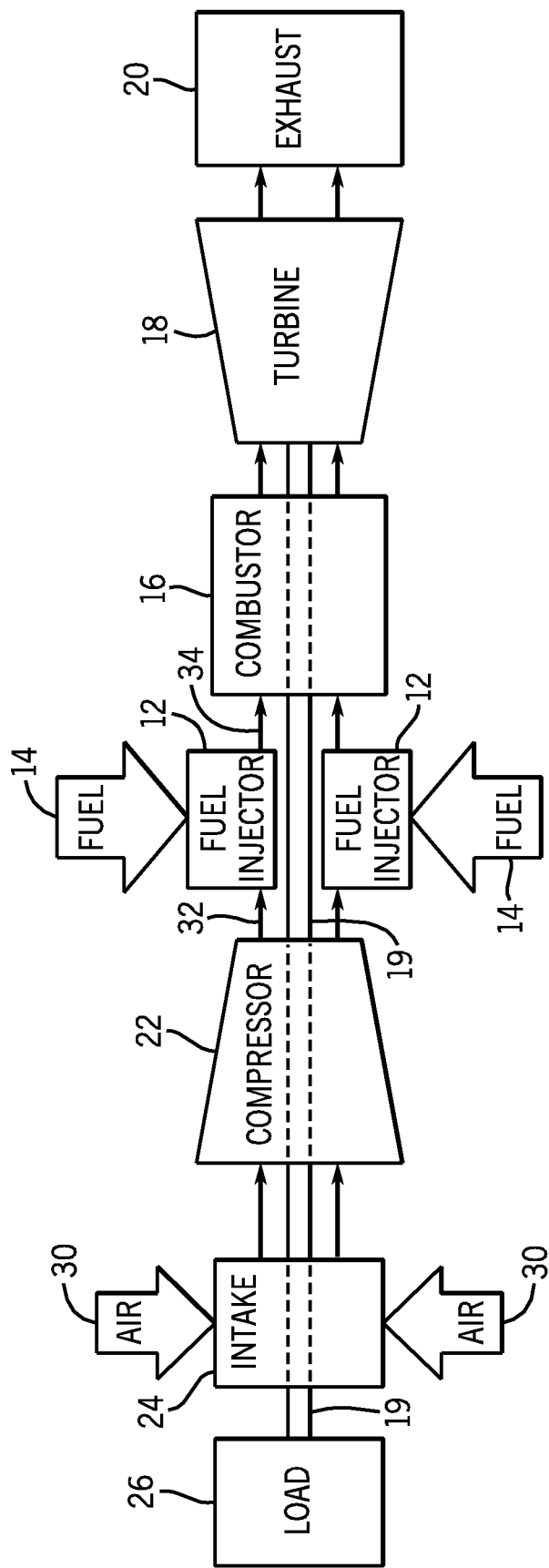
FIG. 1 is a block diagram of a turbine system including a pulse detonation combustor having a pulse detonation tube with a thermally protective layer configured to protect the tube from high transient temperatures in accordance with certain embodiments of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As used herein, a pulse detonation combustor is understood to mean any device or system that produces both a pressure rise and velocity increase from a series of repeated detonations or quasi-detonations within the combustor. A "quasi-detonation" is a supersonic turbulent combustion process that produces a pressure rise and velocity increase higher than the pressure rise and velocity increase produced by a deflagration wave. Embodiments of pulse detonation tubes include a means of igniting a fuel/oxidizer mixture, for example a fuel/air mixture, and a detonation chamber, in which pressure wave fronts initiated by the ignition process coalesce to produce a detonation wave or quasi-detonation. Each detonation or quasi-detonation is initiated either by external ignition, such as spark discharge or laser pulse, or by gas dynamic processes, such as shock focusing, auto ignition or by another detonation (i.e. cross-fire). As used herein, detonation is used to mean either a detonation or quasi-detonation.

Embodiments of the present disclosure may significantly reduce thermal loads applied to a pulse detonation tube by applying a thermally protective layer to an inner surface of the pulse detonation tube. In one embodiment, the pulse detonation tube may include a thermally protective layer and a base tube. The thermally protective layer may be configured to limit temperature fluctuations at an inner surface of the base tube to less than approximately 20 degrees Celsius during operation of the pulse detonation tube. Such a configuration may serve to distribute the heat of detonation over time and insulate the base tube, thereby reducing both the mean and maximum transient temperatures of the base tube. In this manner, longevity of the base tube may be increased and/or the base tube may be constructed from thinner, lighter and/or less expensive materials. In certain embodiments, the thermally protective layer may be a coating applied to an inner surface of the base tube. In alternative embodiments, the thermally protective layer may be a removable mechanical insert disposed within the base tube. In either configuration, a bonding material may be employed to secure the thermally protective layer to the base tube. In further embodiments, a thermally protective layer may be disposed adjacent to a base material of a downstream component, such as a nozzle and/or turbine component, to protect the base material from temperature fluctuations associated with pulse detonation system operation.

Turning now to the drawings and referring first to FIG. 1, a block diagram of an embodiment of a gas turbine system 10 is illustrated. The turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. As will be appreciated, the turbine 18 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the exhaust of the combustion process may exit the gas turbine system 10 via an exhaust outlet 20.

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As discussed in detail below, one or more pulse detonation tubes may be provided for use within the combustor 16. The tubes are configured to receive compressed air 32 and fuel 14 in discrete pulses. After a pulse detonation tube has been loaded with a fuel-air mixture, the mixture is detonated by an ignition source, thereby establishing a detonation wave that propagates through the tube at a supersonic velocity. The detonation process produces pressurized exhaust gas within the pulse detonation tube that ultimately drives the turbine 18 to rotate. Certain embodiments may include a thermally protective layer disposed within each pulse detonation tube. The thermally protective layer may be configured to limit temperature fluctuations at an inner surface of a base tube to less than approximately 20 degrees Celsius during operation of the pulse detonation tube. Such a configuration may increase the longevity of the pulse detonation tube and/or facilitate lighter, thinner and/or less expensive tubes. While the pulse detonation tubes are described with reference to a gas turbine system 10, it should be appreciated that the presently disclosed embodiments may be utilized for other applications, such as "pure" pulse detonation engines in which the exhaust is directed through a converging-diverging nozzle directly to ambient to produce raw thrust, as well as other applications employing pulse detonation tubes. Furthermore, while the present embodiments describe a combustion reaction involving fuel and air, it should be appreciated that alternative embodiments may react other oxidizers (e.g., oxygen, nitrous oxide, etc.) with the fuel to produce a combustion reaction.

Figure 2:
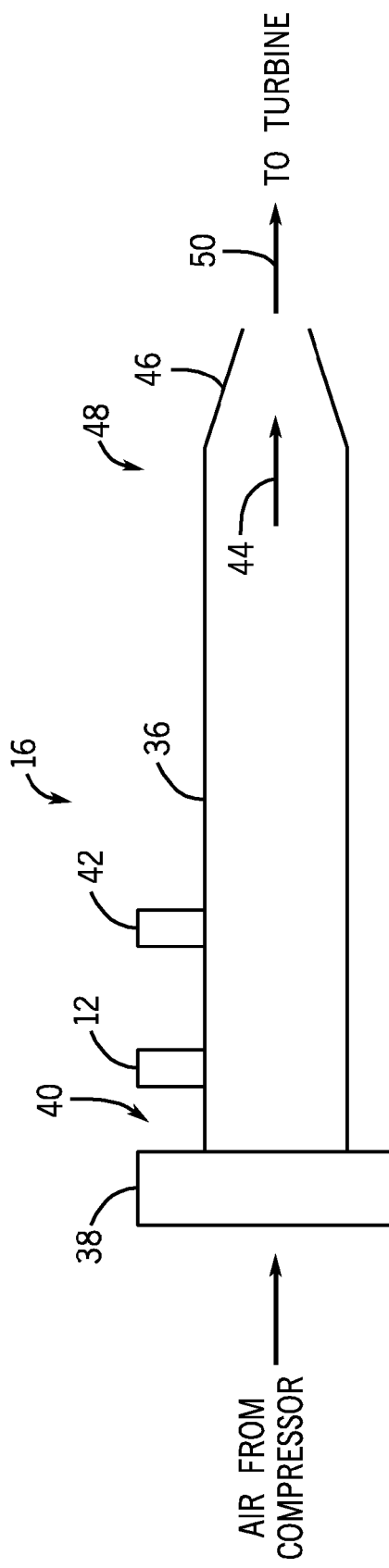
FIG. 2 is a schematic view of one embodiment of a pulse detonation tube that may be employed within the combustor of FIG. 1 in accordance with certain embodiments of the present technique.

FIG. 2 is a schematic view of a pulse detonation tube 36 that may be employed within the combustor 16 of FIG. 1. The pulse detonation tube 36 includes at least one fuel injector 12

(e.g., 1, 2, 3, 4, 5, 6, 7, 8, 9, 10, or more), which feeds fuel to a combustion zone located within the pulse detonation tube 36. Furthermore, the pulse detonation tube 36 includes an air valve 38 disposed to an upstream end 40 of the tube 36. The air valve 38 is configured to inject discrete air pulses into the pulse detonation tube 36. The fuel injector 12 is configured to inject fuel into each of the air pulses to establish a fuel-air mixture suitable for detonation. An ignition source 42 then detonates the fuel-air mixture, thereby forming a detonation wave that propagates through the pulse detonation tube 36. Exhaust gas 44 from the detonation reaction flows into a nozzle 46 disposed to a downstream end 48 of the tube 36.

In the present embodiment, the nozzle 46 is a converging nozzle configured to accelerate the flow of the exhaust gas 44. Consequently, the velocity of exhaust gas 50 emitted from the nozzle 46 may be greater than the velocity of the exhaust gas 44 within the tube 36. As will be appreciated, the exhaust gas 50 causes blades within the turbine 18 to rotate as the exhaust gas 50 flows toward the exhaust outlet 20. As discussed in detail below, the pulse detonation tube 36 and/or the nozzle 46 includes a thermally protective layer configured to distribute the heat of the detonation reaction over time, thereby limiting the maximum exposure temperature of the tube 36 and/or the nozzle 46.

Figure 3:
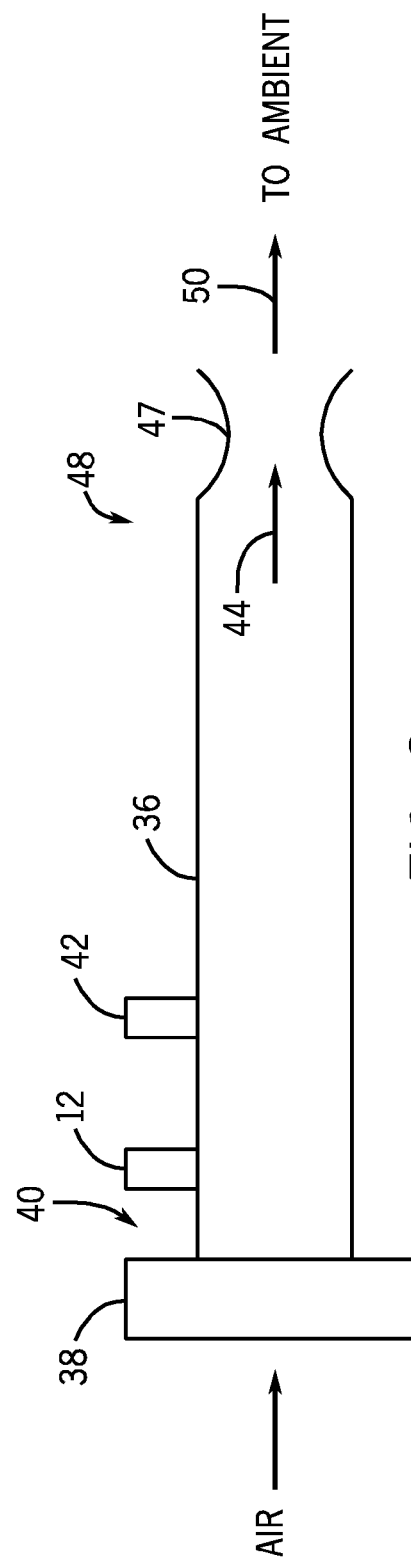
FIG. 3 is a schematic view of another embodiment of the pulse detonation tube coupled to a nozzle to produce thrust in accordance with certain embodiments of the present technique.

FIG. 3 is a schematic view of another embodiment of the pulse detonation tube 36 coupled to a nozzle 47 to produce thrust. As illustrated, the nozzle 47 is a converging-diverging nozzle 47 configured to accelerate the flow of exhaust gas 44 toward the speed of sound within the converging section, and supersonically accelerate the flow within the diverging section. Consequently, a supersonic flow of exhaust gas 50 may be emitted from the nozzle 47. In the present configuration, the exhaust gas 50 is directed to the ambient air such that the pulse detonation tube 36 generates thrust. Such a configuration may be known as a "pure" pulse detonation engine. Similar to the tube 36 described above with reference to FIG. 3, the tube 36 and/or the nozzle 47 may include a thermally protective layer configured to distribute the heat of the detonation reaction over time, thereby limiting the maximum exposure temperature of the tube 36 and/or the nozzle 47.

Figure 4:
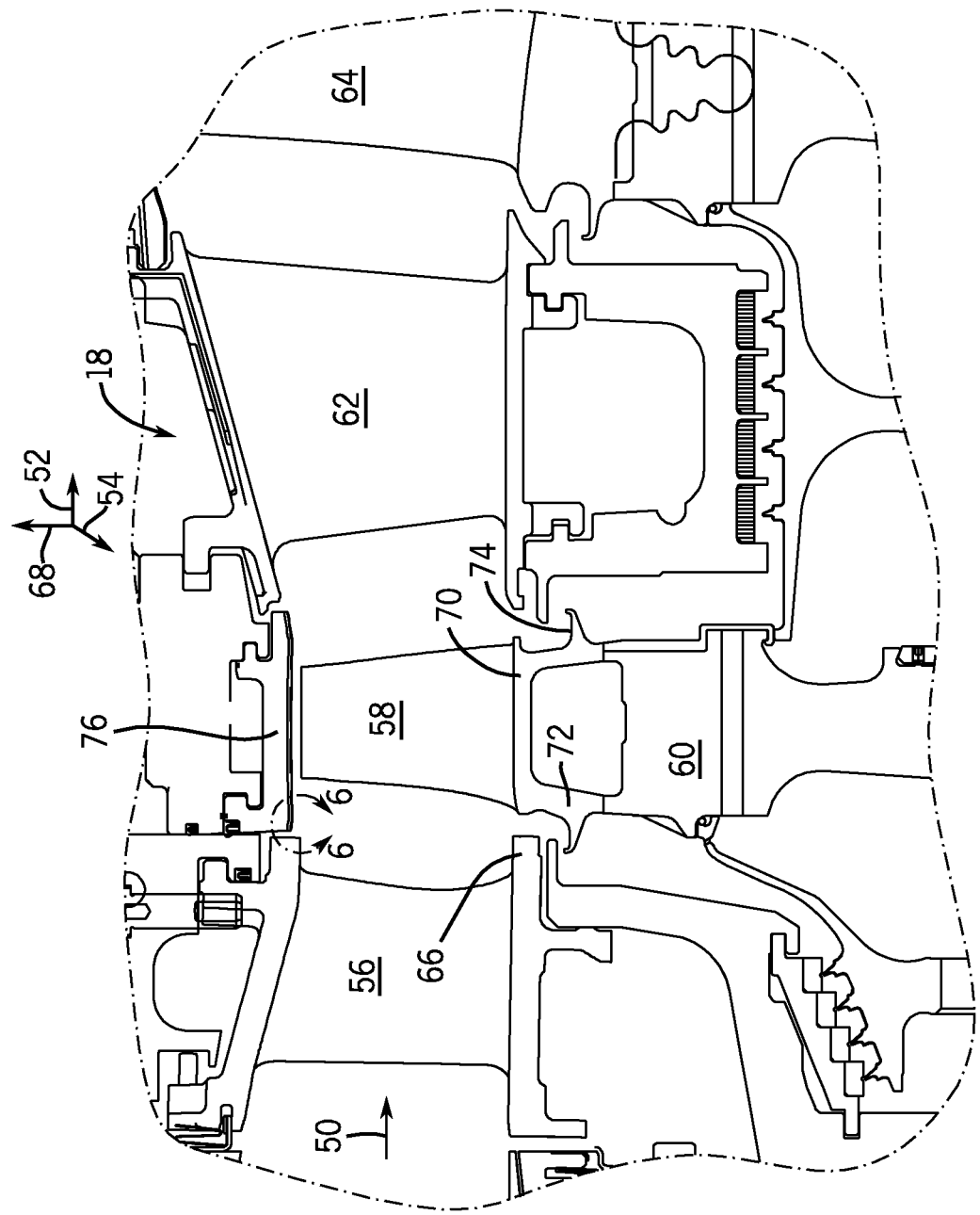
FIG. 4 is a cross-sectional view of a turbine section, illustrating various turbine components that may include a thermally protective layer configured to protect the components from high transient temperatures in accordance with certain embodiments of the present technique.

FIG. 4 is a cross-sectional view of a turbine section, illustrating various turbine components that may include a thermally protective layer configured to protect the components from high transient temperatures. The exhaust gas 50 from the nozzle 46 of the combustor 16 flows into the turbine 18 in an axial direction 52 and/or a circumferential direction 54. The present turbine 18 includes at least two stages, with the first two stages shown in FIG. 4. Other turbine configurations may include more or fewer turbine stages. For example, a turbine may include 1, 2, 3, 4, 5, 6, or more turbine stages. The first turbine stage includes vanes 56 and blades 58 substantially equally spaced in the circumferential direction 54 about the turbine 18. The first stage vanes 56 are rigidly mounted to the turbine 18 and configured to direct combustion gases toward the blades 58. The first stage blades 58 are mounted to a rotor 60 that is driven to rotate by exhaust gas 50 flowing through the blades 58. The rotor 60, in turn, is coupled to the shaft 19, which drives the compressor 22 and the load 26. The exhaust gas 50 then flows through second stage vanes 62 and second stage blades 64. The second stage blades 64 are also coupled to the rotor 60. As the exhaust gas 50 flows through each stage, energy from the gas is converted into rotational energy of the rotor 60. After passing through each turbine stage, the exhaust gas 50 exits the turbine 18 in the axial direction 52.

In the present embodiment, each first stage vane 56 extends outward from an endwall 66 in a radial direction 68. The endwall 66 is configured to block hot exhaust gas 50 from entering the rotor 60. A similar endwall may be present adjacent to the second stage vanes 62, and subsequent downstream vanes, if present. Similarly, each first stage blade 58 extends outward from a platform 70 in the radial direction 68. As will be appreciated, the platform 70 is part of a shank 72 which couples the blade 58 to the rotor 60. The shank 72 also includes a seal, or angel wing, 74 configured to block hot exhaust gas 50 from entering the rotor 60. Similar platforms and angel wings may be present adjacent to the second stage blades 64, and subsequent downstream blades, if present. Furthermore, a shroud 76 is positioned radially outward from the first stage blades 58. The shroud 76 is configured to minimize the quantity of exhaust gas 50 that bypasses the blades 58. Gas bypass is undesirable because energy from the bypassing gas is not captured by the blades 58 and translated into rotational energy.

As will be appreciated, various components within the turbine 18 (e.g., vanes 56 and 62, blades 58 and 64, endwalls 66, platforms 70, angel wings 74, shrouds 76, etc.) will be exposed to the hot exhaust gas 50 from the pulse detonation tube 36. Consequently, in certain embodiments, at least one component of the turbine 18 may include a base material and a thermally protective layer disposed adjacent to a surface of the base material facing the flow of exhaust gas 50. In such embodiments, the thermally protective layer may be configured to limit temperature fluctuations at the surface of the base material facing the flow of exhaust gas 50 to less than approximately 20 degrees Celsius during operation of the pulse detonation system. As a result, the longevity of the turbine component may be increased, and/or lighter, thinner and/or less expensive components may be utilized. For example, the first stage vanes 56 or blades 58 may include a base material with a thermally protective layer disposed adjacent to a surface of the base material facing the flow of exhaust gas 50 to protect the vanes 56 or blades 58 from the hot exhaust gas 50. As will be appreciated, in such a configuration, the surface of the vanes 56 or blades 58 facing the flow of exhaust gas 50 is the outer surface of the vanes 56 or blades 58. By further example, a thermally protective layer may be disposed adjacent to a surface of the base material of the shroud 76, platform 70, or endwall 66 facing the flow of exhaust gas 50. In such a configuration, the surface of the shroud 76, platform 70, or endwall 66 facing the flow of exhaust gas 50 is the inner surface of the respective component (i.e., surface facing the flow path through the turbine 18).

In certain embodiments, all of the components described above (vanes 56 and 62, blades 58 and 64, endwalls 66, platforms 70, angel wings 74 and shrouds 76) may include the thermally protective layer. In alternative embodiments, only certain components may include the thermally protective layer, while other components omit the layer. For example, in one exemplary embodiment, each first stage vane 56 and each first stage blade 58 may include the thermally protective layer, while the other components described above do not include the layer. In further embodiments, only a portion of certain components may include the thermally protective layer. For example, only a fraction of the first stage blades 58 may include the layer, while the remainder may omit the layer. As will be appreciated, any combination of components described above may include or omit the thermally protective layer. In yet further embodiments, other components within the turbine 18 (e.g., cover plate, shank 72, seals, etc.) may also include the thermally protective layer.

Figure 5:
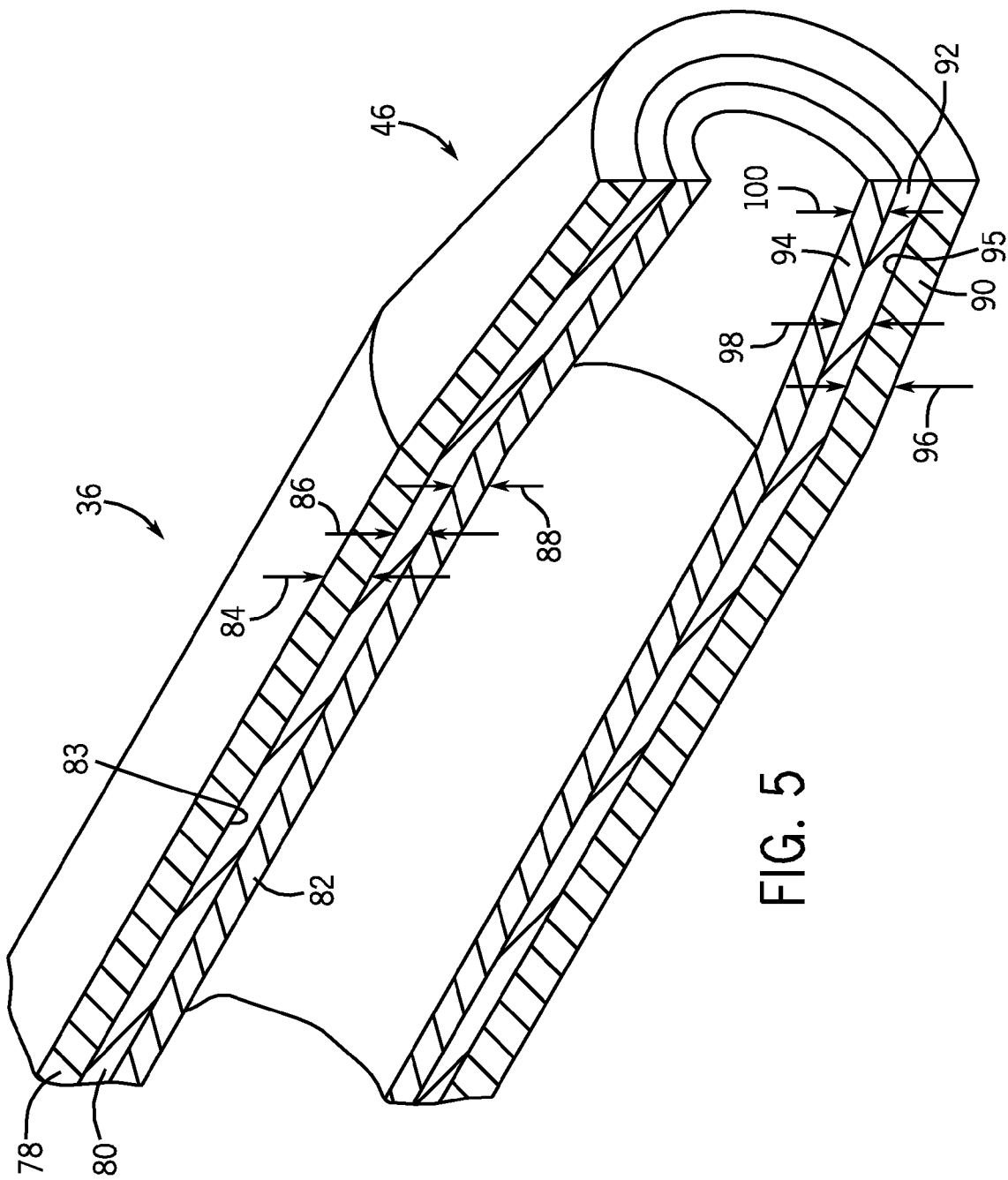
FIG. 5 is a cutaway perspective view of an embodiment of the pulse detonation tube, as shown in FIG. 2, including a thermally protective layer configured to limit temperature fluctuations at an inner surface of a surrounding base tube in accordance with certain embodiments of the present technique.

FIG. 5 is a cutaway perspective view of an embodiment of the pulse detonation tube 36, as shown in FIG. 2, including a thermally protective layer configured to limit temperature fluctuations at an inner surface of a surrounding base tube.

Specifically, the depicted pulse detonation tube 36 includes a base tube 78, a bonding material 80, and a thermally protective layer 82. As illustrated, the thermally protective layer 82 is disposed adjacent to an inner surface 83 (e.g., surface facing the flow of exhaust gas) of the base tube 78. Alternative embodiments may omit the bonding material 80 and dispose the thermally protective layer 82 directly onto the inner surface 83 of the base tube 78. The thermally protective layer 82 is configured to distribute the heat of detonation over time, thereby decreasing the maximum exposure temperature of the base tube 78. While a single thermally protective layer 82 is illustrated in the present embodiment, it should be appreciated that alternative embodiments may include multiple sublayers (e.g., 2, 3, 4, 5, 6, or more) configured to protect the base tube 78 from temperature fluctuations. In certain embodiments, different materials may be selected for each sublayer to establish a desired temperature profile within the base tube 78.

In certain configurations, between 10 to 100 detonations per second may occur within a pulse detonation tube 36, thereby establishing a cycle time of approximately between 10 to 100 ms. In such configurations, the detonation wave may propagate through the pulse detonation tube 36 at approximately 2000 m/s. Therefore, the pulse detonation tube 36 may be exposed to high combustion temperatures for approximately between 0.5 to 4 ms. For example, as the detonation wave propagates, the pulse detonation tube 36 may be exposed to a temperature of approximately 2000 degrees Celsius. After the exhaust gas has exited the pulse detonation tube 36, the interior of the tube 36 may be exposed to gas temperatures of approximately 350 degrees Celsius for the remainder of the 10 to 100 ms cycle. By distributing the heat of detonation over time and insulating the base tube 78, the mean and maximum transient temperatures of the base tube 78 may be significantly reduced.

As will be appreciated, the pulse detonation tube 36 may be exposed to high pressures during operation. For example, the detonation wave may apply more than approximately 18 times the static pressure (e.g., pressure prior to detonation) to the inner surface 83 of the base tube 78. Therefore, the base tube 78 may be particularly configured to resist such pressures for extended periods of operation (e.g., approximately 20,000 hours). Consequently, the base tube 78 may be constructed from a metal, a metal matrix composite, or a ceramic matrix composite having material properties selected based on maximum expected pressure within the pulse detonation tube 36. Furthermore, a thickness 84 of the base tube 78 may be selected based on the structural properties of the base tube material. For example, stronger materials may have a lower thickness 84 to reduce weight.

The pulse detonation tube 36 also includes a thermally protective layer 82 configured to distribute the heat of the detonation reaction over time and/or insulate the base tube 78. As will be appreciated, high frequency cyclical variations in temperature may cause cracks and/or other defects to form within the base tube 78. Such cracks may form even when the base tube 78 experiences moderate variations in temperature. For example, a temperature variation of 20 degrees Celsius at a frequency of 50 Hz may rapidly degrade the structural integrity of the base tube 78 due to thermal stress and crack formation. Consequently, in certain embodiments, the thermally protective layer 82 may be configured to limit temperature fluctuations at the inner surface 83 of the base tube 78 to less than approximately 20 degrees Celsius during operation of the pulse detonation tube 36. In further embodiments, the thermally protective layer 82 may be configured to limit temperature fluctuations to less than approximately 15, 12, 10, 7, 5, or 2 degrees Celsius.

To achieve the desired temperature fluctuation limit, the thermally protective layer 82 may be composed of a material having properties and/or a thickness sufficient to effectively distribute the heat of detonation over time. For example, the thermally protective layer 82 may be composed of a material having a thermal conductivity less than approximately 9 W/mK. Alternative embodiments may employ materials having a thermal conductivity less than 7, 5, 3, 1, or 0.5 W/mK. Thermal conductivity is a material property that relates to the propensity of the material to conduct heat. Materials having a lower thermal conductivity are effective insulators because they resist the flow of heat. The lower thermal conductivity of the thermally protective layer 82 may serve to resist heat flux and dampen temperature fluctuations, thereby reducing the mean and maximum transient temperatures of the base tube 78.

Another parameter that may be indicative of the ability of the thermally protective layer 82 to limit temperature fluctuations at the inner surface 83 of the base tube 78 is the thermal diffusivity, $\alpha$. As will be appreciated, thermal diffusivity is the ratio of thermal conductivity to volumetric heat capacity, and may be defined according to the following formula:

$$\alpha = \frac{k}{\rho c_p}$$

where k is thermal conductivity, and $\rho c_p$ is volumetric heat capacity. Materials having a lower thermal diffusivity do not efficiently transfer heat because they conduct heat slowly relative to their heat capacity. In certain embodiments, the thermally protective layer 82 may be composed of a material having a thermal diffusivity less than approximately 0.000002 m$^2$/s. Alternative embodiments may employ materials having a thermal diffusivity less than 0.0000015, 0.000001, or 0.0000005 m$^2$/s. The lower thermal diffusivity of the thermally protective layer 82 may serve to absorb the heat associated within the combustion process and evenly distribute the heat to the base tube 78 over a period of time, thereby reducing the maximum temperature of the base tube 78 and limiting temperature fluctuations.

The ability of the thermally protective layer 82 to resist temperature fluctuations and/or insulate the base tube 78 may also be defined in terms of Biot number, Bi. As will be appreciated, Biot number is a ratio of heat transfer resistances inside of and at the surface of a material, and may be defined according to the following formula:

$$Bi = \frac{hL_c}{k}$$

where h is the heat transfer coefficient, and $L_c$ is a characteristic length. As will be further appreciated, the characteristic length may be the thickness of the thermally protective layer 82, for example. Materials having a higher Biot number facilitate slower heat conduction inside of the material than at its surface for a given heating or cooling condition, thereby reducing temperature fluctuations at the inner surface 83 of the base tube 78. In certain embodiments, the thermally protective layer 82 may be composed of a material having a Biot number greater than approximately 0.5. Alternative embodiments may employ materials having a Biot number greater than approximately 1, 1.5, 2, 2.5 or 3. The higher Biot number of the thermally protective layer 82 may serve to absorb the heat associated within the combustion process and evenly distribute the heat to the base tube 78 over a period of time, thereby reducing the maximum temperature of the base tube 78 and limiting temperature fluctuations.

Another parameter that may be indicative of the ability of the thermally protective layer 82 to limit temperature fluctuations at the inner surface 83 of the base tube 78 is the resistance to surface temperature fluctuations coefficient, C. The resistance to surface temperature fluctuations coefficient may be defined by the following formula:

$$C = \sqrt{\frac{k\rho c_p \omega}{2h^2}}$$

where ω is frequency. Materials having a lower resistance to surface temperature fluctuations coefficient facilitate large temperature fluctuations at the surface, but may limit the penetration depth of these fluctuations into the thermally protective layer 82, thereby reducing temperature fluctuations at the inner surface 83 of the base tube 78. In certain embodiments, the thermally protective layer 82 may be composed of a material having a resistance to surface temperature fluctuations coefficient of less than approximately 55. Alternative embodiments may employ materials having a resistance to surface temperature fluctuations coefficient of less than approximately 50, 45, 40, 35, 30, 25, 20, 15, or 10. The lower resistance to surface temperature fluctuations coefficient of the thermally protective layer 82 may serve to absorb the heat associated within the combustion process and evenly distribute the heat to the base tube 78 over a period of time, thereby reducing the maximum temperature of the base tube 78 and limiting temperature fluctuations.

Thermal conductivity and thermal diffusivity may also affect the penetration depth of detonation heat into the thermally protective layer 82. For example, penetration depth x may be approximated according to the following formulae:

$$x \propto \sqrt{\frac{k}{\rho c_p}t}, \text{ or } x \propto \sqrt{\alpha t}, \text{ or } x \propto \sqrt{\frac{hL_c t}{\rho c_p Bi}}$$

where t is exposure time to the detonation wave. Based on the computed penetration depth x, a thickness 88 of the thermally protective layer 82 may be selected. Specifically, the thickness 88 may be greater than the penetration depth x such that the heat of detonation does not penetrate the base tube 78. For example, the thickness 88 of the thermally protective layer 82 may be approximate between 3 to 10 thousandths of an inch (i.e., approximately between 76 to 254 microns).

In certain embodiments, the thermally protective layer 82 may include a thermally protective coating applied to the base tube 78. The coating may be applied by any suitable process, such as vapor deposition, dipping, spray coating, electron beam physical vapor deposition, or plasma spraying, for example. As previously discussed, the coating may be configured to limit temperature fluctuations at the inner surface 83 of the base tube 78 to less than approximately 20 degrees Celsius during operation of the pulse detonation tube 36. Based on the penetration depth formula, a coating thickness may be selected based on the thermal conductivity of the coating and the approximate detonation wave exposure time. For example, the coating may be approximately between 1 to 15, 2 to 12, or about 3 to 10 thousandths of an inch thick. The coating may be composed of a ceramic, a metal, a metallic alloy, or any other suitable material. Examples of suitable ceramic coatings may include, but are not limited to, yttria stabilized zirconia (YSZ), ceria stabilized zirconia (CeO$_2$-YSZ), or calcium titanate. Metallic coatings may include, but are not limited to, nickel, cobalt, tungsten, titanium, or alloys including these metals.

In certain embodiments, a bonding material 80 may be disposed between the base tube 78 and the thermally protective layer 82 to secure the coating to the base tube 78. A thickness 86 of the bonding material 80 may be approximately 0.5 to 2 thousandths of an inch (i.e., approximately 12 to 51 microns). The bonding material 80 may be composed of an oxidation resistant metal such as a nickel chromium aluminum yttria (NiCrAlY) alloy or a nickel cobalt chromium aluminum yttria (NiCoCrAlY) alloy, for example. During operation of the combustor 16, heat from the detonation waves may cause the bonding material 80 to form a thermally-grown oxide (TGO) layer between the bonding material 80 and the thermally protective layer 82. The TGO layer may contain an aluminum rich oxide that serves to limit oxidation of the base tube 78. The TGO layer may be approximately between 1 to 10 microns thick.

In an alternative embodiment, the thermally protective layer 82 may be an ablative coating configured to wear over time. In certain configurations, the process of wearing the coating may serve to transfer heat away from the base tube 78, thereby decreasing its steady-state temperature. In addition, heat from the detonation reaction may cause the solid ablative material to vaporize, thereby forming a layer of gas adjacent to the thermally protective layer 82. This gas layer may serve to further insulate the base tube 78 from the hot detonation reaction. As will be appreciated, the ablative coating may be periodically reapplied at desired intervals to ensure a proper coating thickness is maintained.

In a further embodiment, the thermally protective layer 82 may be a removable mechanical insert. Similar to the ablative coating, the mechanical insert may be configured to wear over time. Therefore, the mechanical insert may be periodically removed from the base tube 78 and replaced to ensure a proper thickness 88 of the thermally protective layer 82. In certain embodiments, the mechanical insert may be secured to the base tube 78 by a bonding material 80 similar to the bonding material described above with regard to the coating.

As illustrated, the present pulse detonation tube 36 includes a converging nozzle 46 configured to accelerate and/or direct the flow of exhaust gas 50 from the tube 36 to the turbine 18. Similar to the pulse detonation tube 36 described above, the depicted nozzle 46 includes a base material 90, a bonding material 92 and a thermally protective layer 94. As illustrated, the thermally protective layer 94 is disposed adjacent to an inner surface 95 (e.g., surface facing the flow of exhaust gas) of the base material 90. Alternative embodiments may omit the bonding material 92 and dispose the thermally protective layer 94 directly onto the inner surface 95 of the base material 90. The thermally protective layer 94 is configured to distribute the heat of detonation over time, thereby decreasing the maximum exposure temperature of the base material 90. While a single thermally protective layer 94 is illustrated in the present embodiment, it should be appreciated that alternative embodiments may include multiple sublayers (e.g., 2, 3, 4, 5, 6, or more) configured to protect the base material 90 from temperature fluctuations. In certain embodiments, different materials may be selected for each sublayer to establish a desired temperature profile within the base material 90.

Similar to the base tube 78 described above, a thickness 96 of the base material 90 may be selected based on the structural properties of the base material 90. For example, stronger materials may have a lower thickness 96 to reduce weight. Consequently, the base material 90 may be constructed from a metal, a metal matrix composite, or a ceramic matrix composite having material properties selected based on maximum expected pressure within the nozzle 46.

Similar to the thermally protective layer 82 described above, the thermally protective layer 94 is configured to limit temperature fluctuations at the inner surface 95 of the base material 90 to less than approximately 20 degrees Celsius during operation of the pulse detonation tube 36. In further embodiments, the thermally protective layer 94 may be configured to limit temperature fluctuations to less than approximately 15, 12, 10, 7, 5, or 2 degrees Celsius. To achieve the desired temperature fluctuation limit, the thermally protective layer 94 may be composed of a material having properties and/or a thickness sufficient to effectively distribute the heat of detonation over time. For example, the thermally protective layer 94 may have a thermal conductivity, a thermal diffusivity, a Biot number and/or a resistance to surface temperature fluctuations coefficient within the ranges described above with reference to the thermally protective layer 82.

In addition, a thickness 100 of the thermally protective layer 94 may be greater than the penetration depth of heat into the layer 94, such that the heat of detonation does not penetrate the base material 90. Furthermore, it should be appreciated that the thermally protective layer 94 may be a removable mechanical insert, an applied thermally protective coating or an ablative coating, such as those described above with regard to the thermally protective layer 82 of the pulse detonation tube 36. In certain embodiments, a bonding material 92 may be disposed between the base material 90 and the thermally protective layer 94 to secure the layer 94 to the base material 90. A thickness 98 of the bonding material 92 may be approximately 0.5 to 2 thousandths of an inch (i.e., approximately 12 to 51 microns), and serve to limit oxidation of the base material 90. While the thermally protective layer 94 and bonding material 92 are described above with reference to the converging nozzle 46, it should be appreciated that a similar thermally protective layer 94 and bonding material 92 may be applied to converging-diverging nozzles 47, such as the one illustrated in FIG. 3.

Figure 6:
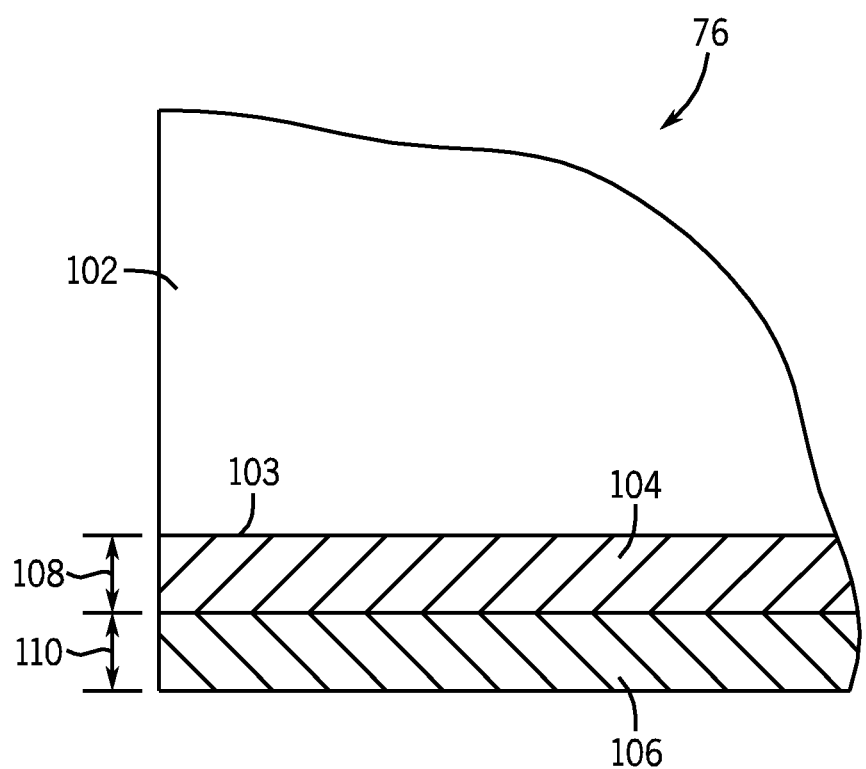
FIG. 6 is a cross-sectional view of a shroud, taken within line 6-6 of FIG. 4, including a thermally protective layer configured to limit temperature fluctuations at a surface of the shroud facing a flow of exhaust gas in accordance with certain embodiments of the present technique.

FIG. 6 is a cross-sectional view of a shroud 76, taken within line 6-6 of FIG. 4, including a thermally protective layer configured to limit temperature fluctuations at a surface of the shroud 76 facing the flow of exhaust gas. As illustrated, the shroud 76 includes a base material 102, a bonding material 104 and a thermally protective layer 106. The thermally protective layer 106 is disposed adjacent to an inner surface 103 (e.g., surface facing the flow of exhaust gas) of the base material 102. Alternative embodiments may omit the bonding material 104 and dispose the thermally protective layer 106 directly onto the inner surface 103 of the base material 102. The thermally protective layer 106 is configured to distribute the heat of detonation over time, thereby decreasing the maximum exposure temperature of the base material 102. While a single thermally protective layer 106 is illustrated in the present embodiment, it should be appreciated that alternative embodiments may include multiple sublayers (e.g., 2, 3, 4, 5, 6, or more) configured to protect the base material 102 from temperature fluctuations. In certain embodiments, different materials may be selected for each sublayer to establish a desired temperature profile within the base material 102.

Similar to the thermally protective layer 82 described above, the thermally protective layer 106 is configured to limit temperature fluctuations at the inner surface 103 of the base material 102 to less than approximately 20 degrees Celsius during operation of the turbine 18. In further embodiments, the thermally protective layer 106 may be configured to limit temperature fluctuations to less than approximately 15, 12, 10, 7, 5, or 2 degrees Celsius. To achieve the desired temperature fluctuation limit, the thermally protective layer 106 may be composed of a material having properties and/or a thickness sufficient to effectively distribute the heat of detonation over time. For example, the thermally protective layer 106 may have a thermal conductivity, a thermal diffusivity, a Biot number and/or a resistance to surface temperature fluctuations coefficient within the ranges described above with reference to the thermally protective layer 82.

In addition, a thickness 110 of the thermally protective layer 106 may be greater than the penetration depth of heat into the layer 106, such that the heat of detonation does not penetrate the base material 102. Furthermore, it should be appreciated that the thermally protective layer 106 may be a removable mechanical insert, an applied thermally protective coating or an ablative coating, such as those described above with regard to the thermally protective layer 82 of the pulse detonation tube 36. In certain embodiments, a bonding material 104 may be disposed between the base material 102 and the thermally protective layer 106 to secure the layer 106 to the base material 102. A thickness 108 of the bonding material 104 may be approximately 0.5 to 2 thousandths of an inch (i.e., approximately 12 to 51 microns), and serve to limit oxidation of the base material 102. While the thermally protective layer 106 and bonding material 104 are described above with reference to the shroud 76, it should be appreciated that a similar thermally protective layer 106 and bonding material 104 may be applied to vanes 56 and 62, blades 58 and 64, endwalls 66, platforms 70, angel wings 76, or any other component within the turbine 18 to protect the turbine 18 from temperature fluctuations associated with operation of the pulse detonation combustor 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A pulse detonation system, comprising:
a pulse detonation tube comprising a base tube and a thermally protective layer disposed adjacent to an inner surface of the base tube, wherein the thermally protective layer is configured to limit temperature fluctuations at the inner surface of the base tube to less than approximately 20 degrees Celsius during operation of the pulse detonation system, and wherein the thermally protective layer does not comprise a ceramic coating, and wherein a thickness of the thermally protective layer is greater than a penetration depth of heat from a detonation reaction within the pulse detonation tube, and wherein the penetration depth x is obtained according to formulae:

$$x \propto \sqrt{\frac{k}{\rho c_p} t}, \text{ or } x \propto \sqrt{\alpha t}, \text{ or } x \propto \sqrt{\frac{hL_c t}{\rho c_p Bi}}$$

where t is exposure time to a detonation wave, h is a heat transfer coefficient $L_c$ is characteristic length, α is thermal diffusivity, k is thermal conductivity, $\rho c_p$ is volumetric heat capacity, and Bi is Biot number.

2. The pulse detonation system of claim 1, comprising a nozzle coupled to a downstream end of the pulse detonation tube, wherein the nozzle comprises a base material and a second thermally protective layer disposed adjacent to an inner surface of the base material, and the second thermally protective layer is configured to limit temperature fluctuations at the inner surface of the base material to less than approximately 20 degrees Celsius during operation of the pulse detonation system.

3. The pulse detonation system of claim 1, comprising a turbine disposed downstream from the pulse detonation tube and configured to receive a flow of exhaust gas from the pulse detonation tube, wherein the turbine comprises at least one component comprising a base material and a second thermally protective layer disposed adjacent to a surface of the base material facing the flow of exhaust gas, and the second thermally protective layer is configured to limit temperature fluctuations at the surface of the base material facing the flow of exhaust gas to less than approximately 20 degrees Celsius during operation of the pulse detonation system.

4. The pulse detonation system of claim 1, wherein a thermal conductivity of the thermally protective layer is less than approximately 9 W/mK, a thermal diffusivity of the thermally protective layer is less than approximately 0.000002 m$^2$/s, a Biot number of the thermally protective layer is greater than approximately 0.5, a resistance to surface temperature fluctuations coefficient of the thermally protective layer is less than approximately 55, or a combination thereof.

5. The pulse detonation system of claim 1, wherein the thermally protective layer is configured to limit temperature fluctuations at the inner surface of the base tube to less than approximately 15 degrees Celsius during operation of the pulse detonation system.

6. The pulse detonation system of claim 1, wherein the thermally protective layer comprises a coating applied to the inner surface of the base tube.

7. The pulse detonation system of claim 6, wherein the coating comprises a metal or a metallic alloy.

8. The pulse detonation system of claim 1, wherein the thermally protective layer comprises a removable mechanical insert.

9. The pulse detonation system of claim 1, wherein the thermally protective layer is configured to ablate during operation of the pulse detonation system.

* * * * *